(12) United States Patent
Haravu et al.

(10) Patent No.: US 11,514,075 B2
(45) Date of Patent: Nov. 29, 2022

(54) SYSTEM AND METHOD FOR PRIORITIZING REPLICATION COPY ACTIVITY

(71) Applicant: EMC IP Holding Company, LLC, Hopkinton, MA (US)

(72) Inventors: Nagasimha G. Haravu, Apex, NC (US); Charles C. Bailey, Cary, NC (US); Girish Sheelvant, Hopkinton, MA (US); Nagapraveen Veeravenkata Seela, Cary, NC (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 309 days.

(21) Appl. No.: 16/861,747

(22) Filed: Apr. 29, 2020

(65) Prior Publication Data

US 2021/0342362 A1    Nov. 4, 2021

(51) Int. Cl.
*G06F 16/27* (2019.01)
*G06F 11/14* (2006.01)

(52) U.S. Cl.
CPC .......... *G06F 16/27* (2019.01); *G06F 11/1464* (2013.01); *G06F 11/1469* (2013.01); *G06F 2201/84* (2013.01)

(58) Field of Classification Search
CPC .. G06F 16/27; G06F 11/1464; G06F 11/1469; G06F 2201/84
See application file for complete search history.

(56) References Cited

U.S. PATENT DOCUMENTS

| | | | | |
|---|---|---|---|---|
| 10,983,873 B1* | 4/2021 | Blackard | ............ | G06F 11/1461 |
| 11,005,935 B1* | 5/2021 | Littlefield | ........... | G06F 11/1464 |
| 2010/0179941 A1* | 7/2010 | Agrawal | ............... | G06F 16/184 |
| | | | | 707/639 |
| 2011/0295806 A1* | 12/2011 | Erofeev | .............. | G06F 11/1435 |
| | | | | 707/634 |
| 2013/0117226 A1* | 5/2013 | Jain | ......................... | G06F 16/27 |
| | | | | 707/625 |
| 2014/0201144 A1* | 7/2014 | Vibhor | .................. | G06F 16/178 |
| | | | | 707/634 |
| 2015/0082100 A1* | 3/2015 | Jain | ........................ | G06F 16/178 |
| | | | | 714/48 |
| 2016/0019119 A1* | 1/2016 | Gupta | ................. | G06F 11/1461 |
| | | | | 707/654 |

(Continued)

*Primary Examiner* — Huawen A Peng
(74) *Attorney, Agent, or Firm* — Brian J. Colandreo; Mark H. Whittenberger; Holland & Knight LLP

(57) ABSTRACT

A method, computer program product, and computer system for triggering, by a computing device, a synchronization activity on a storage object. A request may be executed for a copy operation resulting from the synchronization activity to copy the storage object from a source to a destination when a current number of concurrent copy operations is below a maximum number of copy operations. The request for the copy operation resulting from the synchronization activity to copy the storage object from the source to the destination may be placed in a queue when the current number of concurrent copy operations is at least at the maximum number of copy operations. One or more attributes of the request in the queue may be identified. The request for the copy operation may be executed according to a replication policy based upon, at least in part, the one or more attributes of the request in the queue.

17 Claims, 4 Drawing Sheets

(56) References Cited

U.S. PATENT DOCUMENTS

| | | | |
|---|---|---|---|
| 2016/0202925 A1* | 7/2016 | Dain | G06F 3/0689 |
| | | | 714/6.22 |
| 2016/0335283 A1* | 11/2016 | Rabinovich | G06F 11/1458 |
| 2017/0168903 A1* | 6/2017 | Dornemann | G06F 11/2038 |
| 2018/0260149 A1* | 9/2018 | Zhou | G06F 3/067 |
| 2018/0276085 A1* | 9/2018 | Mitkar | G06F 3/0619 |
| 2020/0099692 A1* | 3/2020 | Jindal | G06F 11/1438 |
| 2021/0311835 A1* | 10/2021 | Futey | G06F 11/1451 |

* cited by examiner

SYSTEM AND METHOD FOR PRIORITIZING REPLICATION COPY ACTIVITY

BACKGROUND

Generally, storage objects may be replicated to a remote site to protect from disasters at the primary site where the storage objects may be stored. In some storage systems, such as a unified storage system, these services may be offered to thousands of physical volumes and file systems, and tens of thousands of virtual volumes.

BRIEF SUMMARY OF DISCLOSURE

In one example implementation, a method, performed by one or more computing devices, may include but is not limited to triggering, by a computing device, a synchronization activity on a storage object. A request may be executed for a copy operation resulting from the synchronization activity to copy the storage object from a source to a destination when a current number of concurrent copy operations is below a maximum number of copy operations. The request for the copy operation resulting from the synchronization activity to copy the storage object from the source to the destination may be placed in a queue when the current number of concurrent copy operations is at least at the maximum number of copy operations. One or more attributes of the request in the queue may be identified. The request for the copy operation may be executed according to a replication policy based upon, at least in part, the one or more attributes of the request in the queue.

One or more of the following example features may be included. The synchronization activity may be triggered when a current time equals a sum of a last synchronization time for the storage object plus a percentage of a Recovery Point Objective value. The one or more attributes of the request in the queue may include at least one of an identification of the storage object, a time-to-Recovery-Point-Objective-violation of the storage object, a time-to-alert for the storage object, and a generation time of the copy request. The replication policy may prioritize the copy request for execution from the queue according to a plurality of rules. A first rule of the plurality of rules may include prioritizing execution of the copy request when the copy request is in an alerted state with an oldest time-to-alert value. A second rule of the plurality of rules may include prioritizing execution of the copy request when the copy request is in a Recovery Point Objective alerted state with an oldest time-to-Recovery-Point-Objective-violation value, wherein the first rule may have a higher priority than the second rule. A third rule of the plurality of rules may include prioritizing execution of the copy request based upon an oldest request generation time when both the copy request and another copy request match one of the first and second rule, wherein the second rule may have a higher priority than the third rule.

In another example implementation, a computing system may include one or more processors and one or more memories configured to perform operations that may include but are not limited to triggering a synchronization activity on a storage object. A request may be executed for a copy operation resulting from the synchronization activity to copy the storage object from a source to a destination when a current number of concurrent copy operations is below a maximum number of copy operations. The request for the copy operation resulting from the synchronization activity to copy the storage object from the source to the destination may be placed in a queue when the current number of concurrent copy operations is at least at the maximum number of copy operations. One or more attributes of the request in the queue may be identified. The request for the copy operation may be executed according to a replication policy based upon, at least in part, the one or more attributes of the request in the queue.

One or more of the following example features may be included. The synchronization activity may be triggered when a current time equals a sum of a last synchronization time for the storage object plus a percentage of a Recovery Point Objective value. The one or more attributes of the request in the queue may include at least one of an identification of the storage object, a time-to-Recovery-Point-Objective-violation of the storage object, a time-to-alert for the storage object, and a generation time of the copy request. The replication policy may prioritize the copy request for execution from the queue according to a plurality of rules. A first rule of the plurality of rules may include prioritizing execution of the copy request when the copy request is in an alerted state with an oldest time-to-alert value. A second rule of the plurality of rules may include prioritizing execution of the copy request when the copy request is in a Recovery Point Objective alerted state with an oldest time-to-Recovery-Point-Objective-violation value, wherein the first rule may have a higher priority than the second rule. A third rule of the plurality of rules may include prioritizing execution of the copy request based upon an oldest request generation time when both the copy request and another copy request match one of the first and second rule, wherein the second rule may have a higher priority than the third rule.

In another example implementation, a computer program product may reside on a computer readable storage medium having a plurality of instructions stored thereon which, when executed across one or more processors, may cause at least a portion of the one or more processors to perform operations that may include but are not limited to triggering a synchronization activity on a storage object. A request may be executed for a copy operation resulting from the synchronization activity to copy the storage object from a source to a destination when a current number of concurrent copy operations is below a maximum number of copy operations. The request for the copy operation resulting from the synchronization activity to copy the storage object from the source to the destination may be placed in a queue when the current number of concurrent copy operations is at least at the maximum number of copy operations. One or more attributes of the request in the queue may be identified. The request for the copy operation may be executed according to a replication policy based upon, at least in part, the one or more attributes of the request in the queue.

One or more of the following example features may be included. The synchronization activity may be triggered when a current time equals a sum of a last synchronization time for the storage object plus a percentage of a Recovery Point Objective value. The one or more attributes of the request in the queue may include at least one of an identification of the storage object, a time-to-Recovery-Point-Objective-violation of the storage object, a time-to-alert for the storage object, and a generation time of the copy request. The replication policy may prioritize the copy request for execution from the queue according to a plurality of rules. A first rule of the plurality of rules may include prioritizing execution of the copy request when the copy request is in an alerted state with an oldest time-to-alert value. A second rule of the plurality of rules may include prioritizing execution of the copy request when the copy request is in a Recovery Point Objective alerted state with an oldest time-to-Recovery-Point-Objective-violation value, wherein the first rule may have a higher priority than the second rule. A third rule of the plurality of rules may include prioritizing execution of the copy request based upon an oldest request generation time when both the copy request and another copy request match one of the first and second rule, wherein the second rule may have a higher priority than the third rule.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
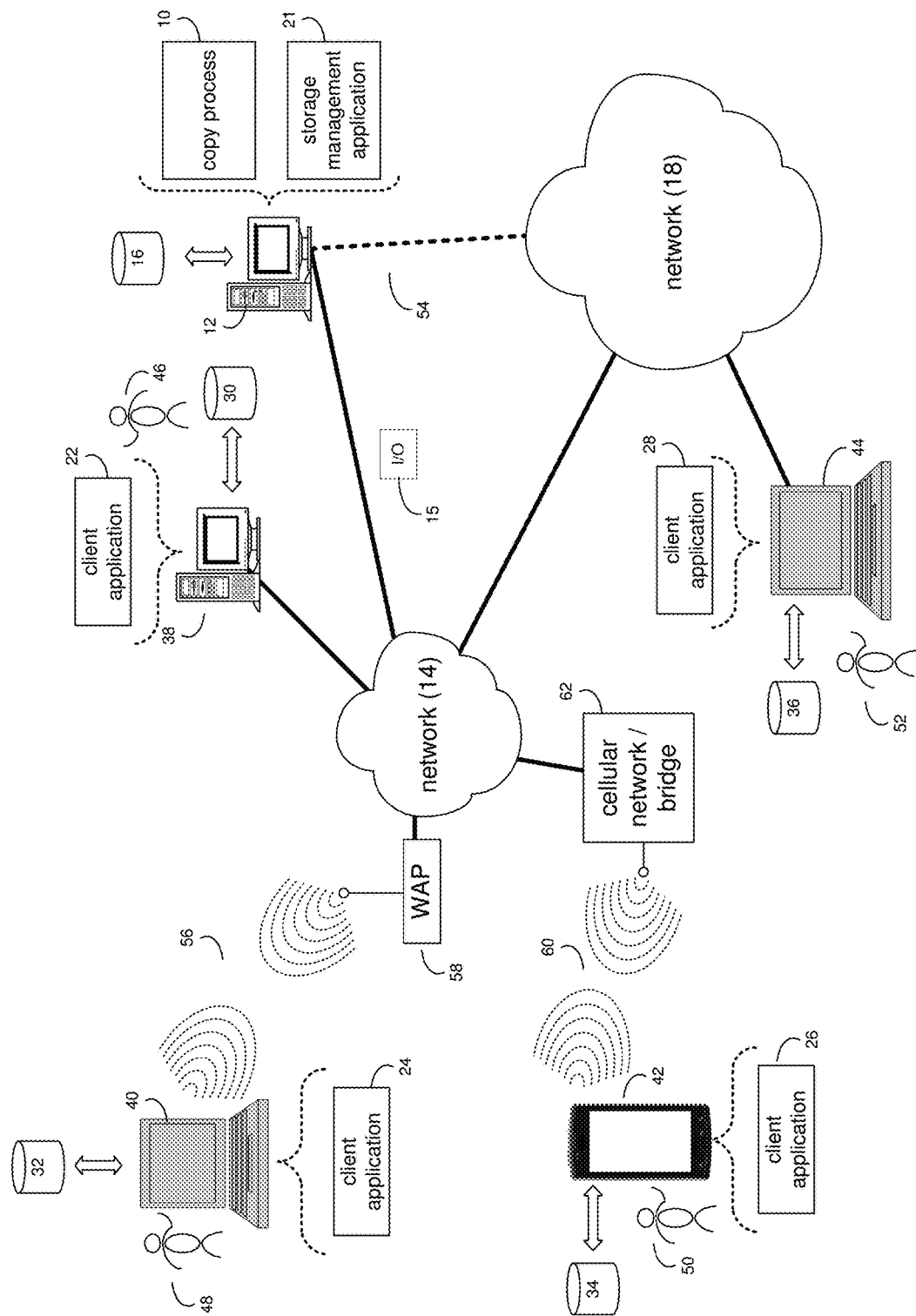
FIG. 1 is an example diagrammatic view of a copy process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown copy process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a copy process, such as copy process 10 of FIG. 1, may trigger, by a computing device, a synchronization activity on a storage object. A request may be executed for a copy operation resulting from the synchronization activity to copy the storage object from a source to a destination when a current number of concurrent copy operations is below a maximum number of copy operations. The request for the copy operation resulting from the synchronization activity to copy the storage object from the source to the destination may be placed in a queue when the current number of concurrent copy operations is at least at the maximum number of copy operations. One or more attributes of the request in the queue may be identified. The request for the copy operation may be executed according to a replication policy based upon, at least in part, the one or more attributes of the request in the queue.

In some implementations, the instruction sets and subroutines of copy process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, copy process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, copy process 10 and/or storage management application 21 may be accessed via one or more of client applications 22, 24, 26, 28. In some implementations, copy process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within copy process 10, a component of copy process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of copy process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of copy process 10 (and vice versa). Accordingly, in some implementations, copy process 10 may be a purely server-side application, a purely client-side application, or a hybrid server-side/client-side application that is cooperatively executed by one or more of client applications 22, 24, 26, 28 and/or copy process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, copy process 10, and storage management application 21, taken singly or in any combination, may effectuate some or all of the same functionality, any description of effectuating such functionality via one or more of client applications 22, 24, 26, 28, copy process 10, storage management application 21, or combination thereof, and any described interaction(s) between one or more of client applications 22, 24, 26, 28, copy process 10, storage management application 21, or combination thereof to effectuate such functionality, should be taken as an example only and not to limit the scope of the disclosure.

In some implementations, one or more of users 46, 48, 50, 52 may access computer 12 and copy process 10 (e.g., using one or more of client electronic devices 38, 40, 42, 44) directly through network 14 or through secondary network 18. Further, computer 12 may be connected to network 14 through secondary network 18, as illustrated with phantom link line 54. Copy process 10 may include one or more user interfaces, such as browsers and textual or graphical user interfaces, through which users 46, 48, 50, 52 may access copy process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
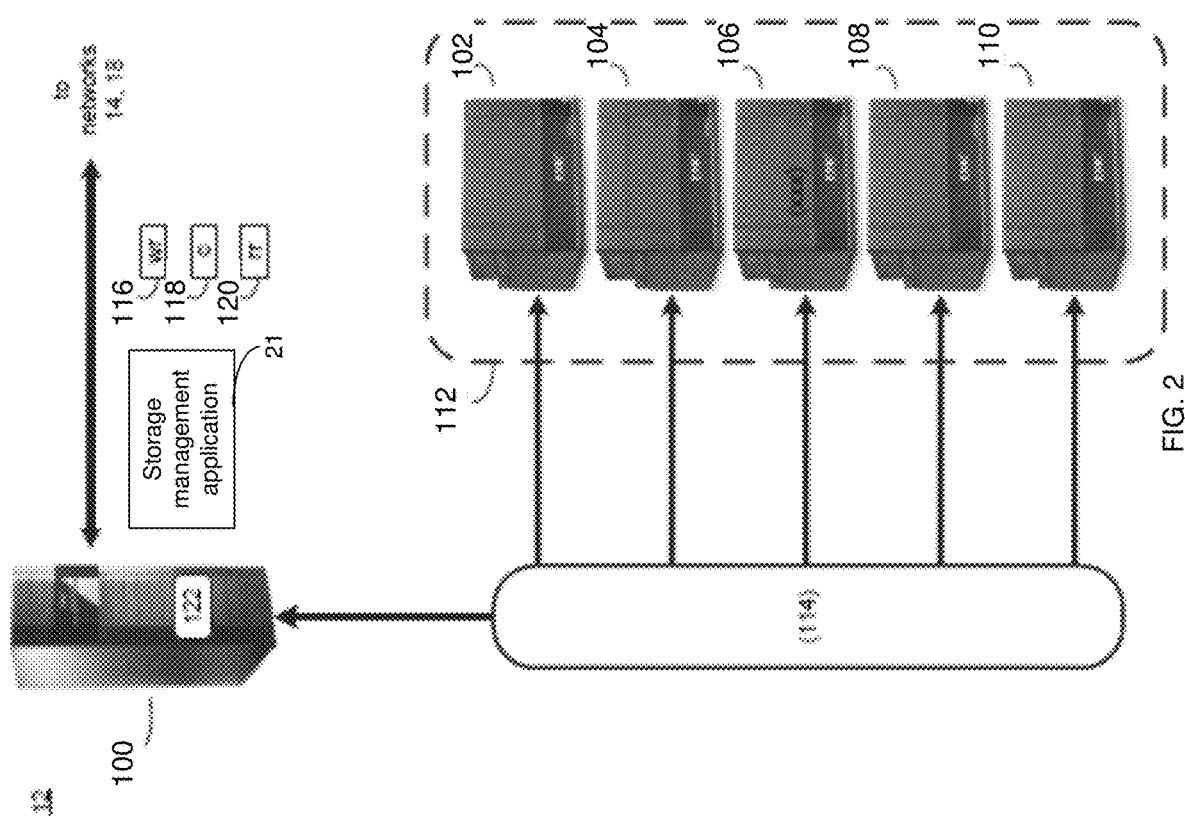
FIG. 2 is an example diagrammatic view of a storage system of FIG. 1 according to one or more example implementations of the disclosure.
Figure 3:
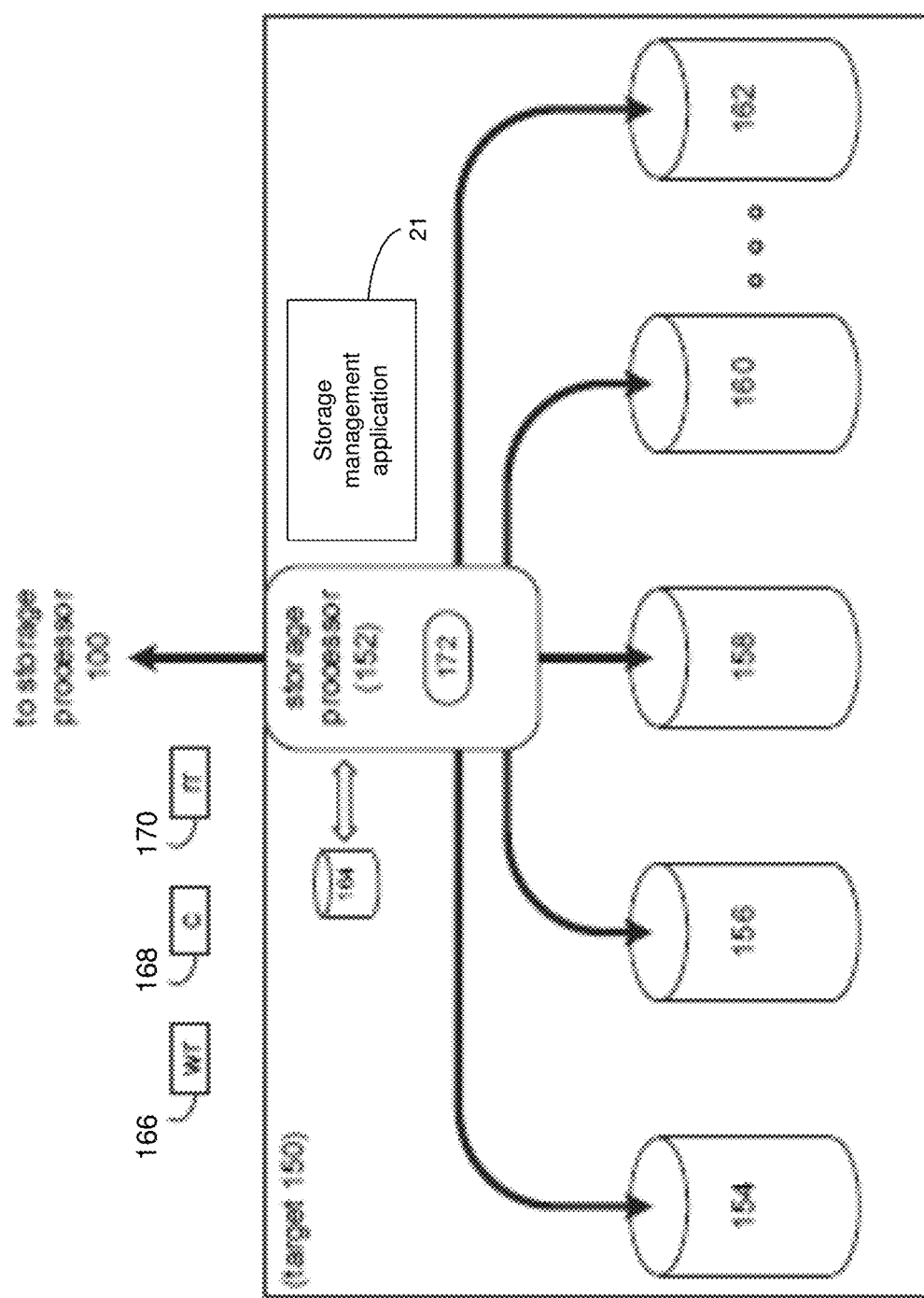
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or copy process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Generally, storage objects may be replicated to a remote site to protect from disasters at the primary site where the storage objects may be stored. In some storage systems, such as a unified storage system, these services may be offered to thousands of physical volumes and file systems, and tens of thousands of virtual volumes. These objects may be protected by applying a policy that dictates the acceptable maximum data loss in the event of a disaster. When replication service is offered natively on the storage system, it may be offered a smaller portion of the available system resources to ensure replication activities minimally impact ongoing host IO activities. As will be discussed below, the present disclosure may describe a method for prioritizing replication activity in accordance with a protection policy. The first step in protecting a storage object from disaster is to define the protection policy consisting of a replication rule and applying the policy to the storage object. A replication rule may generally include the following example and non-limiting attributes:

Remote System: Identifies the storage system at the disaster recovery (DR) site where the storage object is replicated.

Recovery Point Objective (RPO): A measure of time (e.g., minutes) that describes the amount of data loss that is tolerated in the event of a disaster. The goal of the replication service is to ensure the "freshness" of data on the DR site is never greater than this value.

Alert Threshold: In the event that the RPO is indeed violated, this attribute, described as a measure of time (e.g., minutes), provides a cushion for the replication service to bring the storage object back in RPO compliance. If the RPO is continuously violated past this time, the user may be notified of the violation through an alert.

Generally, a replication service (which may include portions of copy process 10) may periodically perform a replication "sync" activity on a storage object to keep the object within RPO compliance. The following example and non-limiting set of events may transpire during this activity:

An internal snapshot, or a space-efficient copy, may be taken locally for the storage object. If this is the first time a sync is performed on the storage object, all the allocated blocks of the storage object may be computed. Otherwise, a snapshot differential command may be issued between the internal snapshots of the current sync and the last sync activity. This command may return a set of blocks that were modified since the last sync activity. The list of data blocks from either of these two conditions may serve as the data that needs to be transferred to the remote system. A copy operation may be issued by using the list of blocks determined from the previous step. The copy operation may read the data blocks from the local storage object and may write to the replica storage object on the remote system. When the copy operation completes, the replication service may update the "last sync time" of the storage object with the timestamp of the internal snapshot. The protection policy of the storage object may be in violation if the difference between the "current time" and the "last sync time" is greater than the RPO value in the replication rule. Stating this differently, the storage administrator (or other user) may be alerted when the difference between the "current time" and the "last sync time" is greater than the sum of the RPO and an alert threshold value in the replication rule. This method of generating sync requests and concurrency management may achieve the following example and non-limiting benefits: 1. If an object is already in an alerted state, the present disclosure may try to clear the alert as soon as possible (so user can be notified of the alert clearing), 2. if an object is in an RPO violated state but not alerted to the user, the present disclosure may try to prevent an alert from being generated (and thereby avoiding the user's attention), and 3. prevent RPO violation if possible.

As will be discussed below, copy process 10 may at least help, e.g., improve a technology, necessarily rooted in computer technology in order to overcome an example and non-limiting problem specifically arising in the realm of computer storage networks, and being integrated into the practical application of data replication. It will be appreciated that the computer processes described throughout are integrated into one or more practical applications, and when taken at least as a whole are not considered to be well-understood, routine, and conventional functions.

Figure 4:
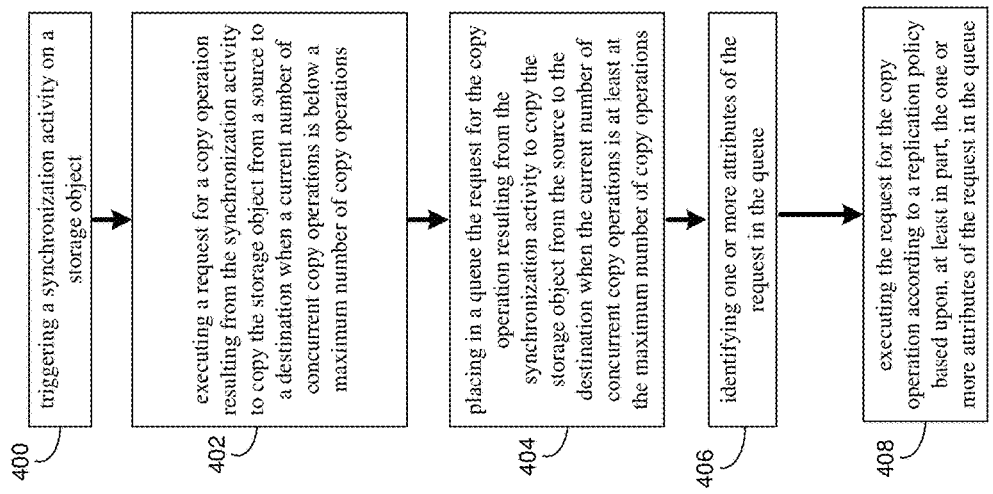
FIG. 4 is an example flowchart of a copy process according to one or more example implementations of the disclosure.

The Copy Process:

As discussed above and referring also at least to the example implementations of FIG. 4, copy process 10 may trigger 400, by a computing device, a synchronization activity on a storage object. Copy process 10 may execute 402 a request for a copy operation resulting from the synchronization activity to copy the storage object from a source to a destination when a current number of concurrent copy operations is below a maximum number of copy operations. Copy process 10 may place 404 in a queue the request for the copy operation resulting from the synchronization activity to copy the storage object from the source to the destination when the current number of concurrent copy operations is at least at the maximum number of copy operations. Copy process 10 may identify 406 one or more attributes of the request in the queue. Copy process 10 may execute the request for the copy operation according to a replication policy based upon, at least in part, the one or more attributes of the request in the queue.

Generally, a storage administrator (or other user) may typically create (e.g., via copy process 10) a small set of policies/rules (e.g., dozens) that may describe varying levels of protection and may apply them to a large pool (e.g., thousands) of storage objects. For instance, their mission critical storage objects may be replicated to a nearby storage system at high frequency (e.g., RPO=5 minutes) with no tolerance for RPO violation (e.g., Alert Threshold=0), whereas other storage objects may be replicated to a faraway storage system at a much less frequency (e.g., RPO=4 hours) and may tolerate some degree of RPO violations (e.g., Alert Threshold=2 hours). These setting may result in a need to run thousands of copy operations concurrently. Since these copy operations are resource intensive on both the source system (e.g., reads) and the destination system (e.g., writes), only a limited number of such operations are typically performed simultaneously to limit their impact on other activities in the system. As such, copy process 10 may prioritize such concurrent copy requests.

In some implementations, copy process 10 may trigger 400, by a computing device, a synchronization activity on a storage object, and in some implementations, the synchronization activity may be triggered when a current time equals a sum of a last synchronization time for the storage object plus a percentage of a Recovery Point Objective value. For example, the replication service (e.g., via copy process 10) may trigger 400 a sync activity on a storage object when the "current time" equals the sum of the "last sync time" and, e.g., half of RPO value. This may ensure that half of the RPO time is available to complete the sync operation and prevent RPO violation. However, in some implementations, if a previous sync is still ongoing at this time, the new sync request may be held off until the previous sync activity completes. It will be appreciated that the percentage of the RPO need not be half (50%) and may be more or less than 50%. As such, the use of 50% should be taken as example only.

In some implementations, copy process 10 may execute 402 a request for a copy operation resulting from the synchronization activity to copy the storage object from a source to a destination when a current number of concurrent copy operations is below a maximum number of copy operations. In some implementations, copy process 10 may place 404 in a queue the request for the copy operation resulting from the synchronization activity to copy the storage object from the source to the destination when the current number of concurrent copy operations is at least at the maximum number of copy operations. For example, the copy request resulting from a sync may be executed 402 immediately if the current number of concurrent copy operations is below the maximum configured number of copy operations. Otherwise, the copy request may be submitted to be placed 404 a queue.

In some implementations, copy process 10 may identify 406 one or more attributes of the request in the queue, and in some implementations, the one or more attributes of the request in the queue may include at least one of an identification of the storage object, a time-to-Recovery-Point-Objective-violation (time-to-RPO-violation) of the storage object, a time-to-alert for the storage object, and a generation time of the copy request.

In some implementations, copy process 10 may execute the request for the copy operation according to a replication policy based upon, at least in part, the one or more attributes of the request in the queue. For example, in some implementations, the replication policy may prioritize the copy request for execution from the queue according to a plurality of rules. For instance, when an executing copy request completes, and if the copy queue is not empty, a request may be extracted from the queue using logic in the order of priority shown below. The request may then be submitted for execution.

In some implementations, a first rule of the plurality of rules may include prioritizing execution of the copy request when the copy request is in an alerted state with an oldest time-to-alert value. For example, copy process 10 may find requests where the "current-time" has exceeded the "time-to-alert" (meaning these objects are in alerted state). Amongst them, copy process 10 may find the request with the oldest "time-to-alert" value. In some implementations, if multiple requests match, copy process 10 may find request with the oldest request generation time to next select for execution.

In some implementations, a second rule of the plurality of rules may include prioritizing execution of the copy request when the copy request is in a Recovery Point Objective alerted state with an oldest time-to-Recovery-Point-Objective-violation value, wherein the first rule may have a higher priority than the second rule. For example, copy process 10 may find requests where the "current-time" has exceeded the "time-to-RPO-violation" (meaning these objects have their RPO violated). Amongst them, copy process 10 may find the request with the oldest "time-to-RPO-violation" value. In some implementations, if multiple requests match, copy process 10 may find the request with the oldest request generation time to next select for execution.

In some implementations, a third rule of the plurality of rules may include prioritizing execution of the copy request based upon an oldest request generation time when both the copy request and another copy request match one of the first and second rule, wherein the second rule may have a higher priority than the third rule. For example, copy process 10 may find the request with the oldest "time-to-RPO-violation" value. In some implementations, if multiple requests match, copy process 10 may find request with the oldest request generation time to next select for execution.

Examples of the above-noted rules are provided below:

While copy process 10 may be configured to run a fixed number of copy requests concurrently, the following example is kept simple for ease of explanation only by setting the concurrency to one. In other words, for ease of explanation, only one copy request can be executed at any time. In the example, assume the user has created three policies with a replication rule configured in each policy as follows:

1. Policy1: RPO=10 minutes, Alert Threshold=0 minutes
2. Policy2: RPO=10 minutes, Alert Threshold=10 minutes
3. Policy3: RPO=20 minutes, Alert Threshold=20 minutes Further assume in the example that there are four volumes with policy assignment as follows:

1. Volume1: Policy1
2. Volume2: Policy2
3. Volume3: Policy3
4. Volume4: Policy2

In the example, further assume that the policies have been assigned at some point in the past and copy process 10 has been scheduling copy requests periodically to keep the replica volumes on destination in sync with the changes to the source volumes. The scheduler (e.g., via copy process 10) may trigger a copy request at a frequency of, e.g., half of the RPO setting. In this timeline, assume for example purposes only that each time "tick" is one minute starting from a relative time T0. Also assumed for example purposes only is that each copy execution takes a whole number of minutes to complete. Copy process 10 may take "snapshots" of the timeline at interesting points to capture the state of various volumes and how they drive the decision making process. At each snapshot, there is a table with the following columns of attributes:

Volume: Identifies the volume for which the state is being captured

RPO Violated: Indicates if the volume's RPO is violated at that point-in-time

Active Alert: Indicates if an RPO violation alert exists for that volume

Copy request time: Indicates the time when a copy request was generated for the volume RPO violation time: Indicates the time when the RPO would be violated if a copy does not complete by that time for the object Alert time: Indicates the time when an alert would be raised to the user Status: Indicates if a copy request is queued, running, or completed (and a subsequent request is not queued yet)

Copy start time: If the status is running, indicates when the copy was started; otherwise when the previous copy started Copy end time: If the status is completed or queued, indicates when the previous copy completed Last sync time: Indicates the last point-in-time of the volume that is represented on the replica volume (difference between current-time and last-sync-time indicates the potential data loss if the source volume were to be lost; the goal of the replication is to keep this within RPO value)

Table 1 below shows a snapshot taken at time T3. In the previous execution, assume for example purposes only that none of the objects had changed and therefore there was nothing to copy. As a result, all the copies had taken zero minutes to complete. None of the objects have any RPO violations or active violation alerts. The copy requests had arrived for the four objects at one minute apart (T0-T3). When the copy request arrived for V1, there was no other copy being executed and therefore the request was immediately sent to execution at T0. Assuming its last <empty> copy was run at T-5, its RPO violation time and alert time is T5 based on policy1. Likewise, V2's RPO violation time is T6 and alert time is T16 based on policy2, V3's RPO violation time is T12 and alert time is T32 based on policy3, and V4's RPO violation time is T8 and alert time is T8 based on policy1.

TABLE 1

| | | | | | | | | | |
|---|---|---|---|---|---|---|---|---|---|
| | | | | Current Time: T3 | | | | | |
| Volume | RPO Violated | Active Alert | Copy Request Time | RPO Violation Time | Alert Time | Status | Copy Start Time | Copy End Time | Last Sync Time |
| V1 | No | No | T0 | T5 | T5 | Running | T0 | — | T-5 |
| V2 | No | No | T1 | T6 | T16 | Queued | — | — | T-4 |
| V3 | No | No | T2 | T12 | T32 | Queued | — | — | T-8 |
| V4 | No | No | T3 | T8 | T18 | Queued | — | — | T-2 |

Assuming for example purposes only that V1's copy operation took 4 minutes to complete, the next snapshot of the timeline 1 minute is taken later at T4. The status, copy end time and the last sync time have been updated for V1 in the table below. Also, since the RPO violation time for V1 is less than 5 minutes (half of RPO), a new copy request may be immediately generated and queued for V1, as shown. At this time, a new copy request needs to be prioritized from the queued request. Since, none of the objects have an active alert or RPO violation, copy process 10 may choose the request with the oldest copy request time; V2 in this case.

TABLE 2

| | | | | | | | | | |
|---|---|---|---|---|---|---|---|---|---|
| | | | | Current Time: T4 | | | | | |
| Volume | RPO Violated | Active Alert | Copy Request Time | RPO Violation Time | Alert Time | Status | Copy Start Time | Copy End Time | Last Sync Time |
| V1 | No | No | T4 | T5 | T5 | Queued | T0 | T4 | T0 |
| V2 | No | No | T1 | T6 | T16 | Running | T4 | — | T-9 |
| V3 | No | No | T2 | T12 | T32 | Queued | — | — | T-18 |
| V4 | No | No | T3 | T8 | T18 | Queued | — | — | T-2 |

Continuing with the above example, further assuming V2's copy operation took 1 minute to complete, the next snapshot of the timeline may be taken at T5, shown in Table 3 below. Based on the last sync time being T4, the RPO violation time and alert time for the object has been adjusted to T14 and T24 respectively. Since, there is more than 5 minutes (half of RPO in this example) between current time (T5) and RPO violation time (T14), another copy request is not immediately generated for V2. At this time, a new copy request may need to be prioritized from the queued request. In the example, since V1 now has an active RPO alert, and that is the only object with an RPO alert, V1's copy request may be executed by copy process 10.

TABLE 3

Current Time: T5

| Volume | RPO Violated | Active Alert | Copy Request Time | RPO Violation Time | Alert Time | Status | Copy Start Time | Copy End Time | Last Sync Time |
|---|---|---|---|---|---|---|---|---|---|
| V1 | Yes | Yes | T4 | T5 | T5 | Running | T5 | T4 | T0 |
| V2 | No | No | — | T14 | T24 | Completed | T4 | T5 | T4 |
| V3 | No | No | T2 | T12 | T32 | Queued | — | — | T-18 |
| V4 | No | No | T3 | T8 | T18 | Queued | — | — | T-2 |

Further assuming V1's copy operation took 4 minutes to complete, the next snapshot of the timeline may be taken at T9, shown below in Table 4. Since V1 is now within RPO compliance, its RPO violated flag may be flipped as well as its active alert. Moreover, since the time to next RPO violation (6 minutes away in this example) is more than half the RPO time (5 minutes in this example), a subsequent copy request is not immediately queued. However, the current time (T5) is exactly half the time to V2's RPO violation time (T14). Therefore, a copy request may now be generated for V2 and queued. At this time, a new copy request may need to be prioritized from the queued requests. Since, there are no active RPO alerts, and V4 has its RPO violated, its copy request may be selected for execution by copy process 10.

TABLE 4

Current Time: T9

| Volume | RPO Violated | Active Alert | Copy Request Time | RPO Violation Time | Alert Time | Status | Copy Start Time | Copy End Time | Last Sync Time |
|---|---|---|---|---|---|---|---|---|---|
| V1 | No | No | — | T15 | T15 | Completed | T5 | T9 | T5 |
| V2 | No | No | T9 | T14 | T24 | Queued | T4 | T5 | T4 |
| V3 | No | No | T2 | T12 | T32 | Queued | — | — | T-18 |
| V4 | Yes | No | T3 | T8 | T18 | Running | T9 | — | T-2 |

Further assuming V4's copy operation took 30 minutes, copy process 10 may take the next snapshot of the timeline at T39, shown in Table 5 below. Since this copy took a long time to complete, its replica volume is already 30 minutes behind the source volume. Therefore, its RPO violated flag continues to stay on. Also, its alert threshold has been exceeded and an alert has been raised. Therefore, a new copy request may be immediately generated for this object. While this copy was progressing, the scheduler (e.g., via copy process 10) may have detected at time T10 that V1 was within half the RPO time (5 minutes) from violation and generated a copy request that was queued. Also, the long copy operation may have also triggered an RPO violation and user alert of the violation during the copy duration. At this time, a new copy request may need to be prioritized from the queued request. Since there are multiple requests with active alerts, the request with the oldest copy request time (V3) may be selected for execution by copy process 10.

TABLE 5

Current Time: T39

| Volume | RPO Violated | Active Alert | Copy Request Time | RPO Violation Time | Alert Time | Status | Copy Start Time | Copy End Time | Last Sync Time |
|---|---|---|---|---|---|---|---|---|---|
| V1 | Yes | Yes | T10 | T15 | T15 | Queued | T5 | T9 | T5 |
| V2 | Yes | Yes | T9 | T14 | T24 | Queued | T4 | T5 | T4 |
| V3 | Yes | Yes | T2 | T12 | T32 | Running | T39 | — | T-18 |
| V4 | Yes | Yes | T39 | T8 | T18 | Queued | T9 | T39 | T9 |

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   triggering, by a computing device, a synchronization activity on a storage object wherein the synchronization activity is triggered when a current time equals a sum of a last synchronization time for the storage object plus a percentage of a value corresponding to an amount of acceptable data loss;
   executing a request for a copy operation resulting from the synchronization activity to copy the storage object from a source to a destination when a current number of concurrent copy operations is below a maximum number of copy operations;
   placing in a queue the request for the copy operation resulting from the synchronization activity to copy the storage object from the source to the destination when the current number of concurrent copy operations is at least at the maximum number of copy operations;
   identifying one or more attributes of the request in the queue; and
   executing the request for the copy operation according to a replication policy based upon, at least in part, the one or more attributes of the request in the queue.

2. The computer-implemented method of claim 1 wherein the one or more attributes of the request in the queue includes at least one of an identification of the storage object, a time-to-Recovery-Point-Objective-violation of the storage object, a time-to-alert for the storage object, and a generation time of the copy request.

3. The computer-implemented method of claim 2 wherein the replication policy prioritizes the copy request for execution from the queue according to a plurality of rules.

4. The computer-implemented method of claim 3 wherein a first rule of the plurality of rules includes prioritizing execution of the copy request when the copy request is in an alerted state with an oldest time-to-alert value.

5. The computer-implemented method of claim 4 wherein a second rule of the plurality of rules includes prioritizing execution of the copy request when the copy request is in a Recovery Point Objective alerted state with an oldest time-to-Recovery-Point-Objective-violation value, wherein the first rule has a higher priority than the second rule.

6. The computer-implemented method of claim 5 wherein a third rule of the plurality of rules includes prioritizing execution of the copy request based upon an oldest request generation time when both the copy request and another copy request match one of the first and second rule, wherein the second rule has a higher priority than the third rule.

7. A computer program product residing on a computer readable storage medium having a plurality of instructions stored thereon which, when executed across one or more processors, causes at least a portion of the one or more processors to perform operations comprising:
   triggering a synchronization activity on a storage object, wherein the synchronization activity is triggered when a current time equals a sum of a last synchronization time for the storage object plus a percentage of a value corresponding to an amount of acceptable data loss;
   executing a request for a copy operation resulting from the synchronization activity to copy the storage object from a source to a destination when a current number of concurrent copy operations is below a maximum number of copy operations;
   placing in a queue the request for the copy operation resulting from the synchronization activity to copy the storage object from the source to the destination when the current number of concurrent copy operations is at least at the maximum number of copy operations;
   identifying one or more attributes of the request in the queue; and
   executing the request for the copy operation according to a replication policy based upon, at least in part, the one or more attributes of the request in the queue.

8. The computer program product of claim 7 wherein the one or more attributes of the request in the queue includes at least one of an identification of the storage object, a time-to-Recovery-Point-Objective-violation of the storage object, a time-to-alert for the storage object, and a generation time of the copy request.

9. The computer program product of claim 8 wherein the replication policy prioritizes the copy request for execution from the queue according to a plurality of rules.

10. The computer program product of claim 9 wherein a first rule of the plurality of rules includes prioritizing execution of the copy request when the copy request is in an alerted state with an oldest time-to-alert value.

11. The computer program product of claim 10 wherein a second rule of the plurality of rules includes prioritizing execution of the copy request when the copy request is in a Recovery Point Objective alerted state with an oldest time-to-Recovery-Point-Objective-violation value, wherein the first rule has a higher priority than the second rule.

12. The computer program product of claim 11 wherein a third rule of the plurality of rules includes prioritizing execution of the copy request based upon an oldest request generation time when both the copy request and another copy request match one of the first and second rule, wherein the second rule has a higher priority than the third rule.

13. A computing system including one or more processors and one or more memories configured to perform operations comprising:
triggering a synchronization activity on a storage object, wherein the synchronization activity is triggered when a current time equals a sum of a last synchronization time for the storage object plus a percentage of a value corresponding to an amount of acceptable data loss;
executing a request for a copy operation resulting from the synchronization activity to copy the storage object from a source to a destination when a current number of concurrent copy operations is below a maximum number of copy operations;
placing in a queue the request for the copy operation resulting from the synchronization activity to copy the storage object from the source to the destination when the current number of concurrent copy operations is at least at the maximum number of copy operations;
identifying one or more attributes of the request in the queue; and
executing the request for the copy operation according to a replication policy based upon, at least in part, the one or more attributes of the request in the queue.

14. The computing system of claim 13 wherein the one or more attributes of the request in the queue includes at least one of an identification of the storage object, a time-to-Recovery-Point-Objective-violation of the storage object, a time-to-alert for the storage object, and a generation time of the copy request.

15. The computing system of claim 14 wherein the replication policy prioritizes the copy request for execution from the queue according to a plurality of rules.

16. The computing system of claim 15 wherein a first rule of the plurality of rules includes prioritizing execution of the copy request when the copy request is in an alerted state with an oldest time-to-alert value.

17. The computing system of claim 16 wherein a second rule of the plurality of rules includes prioritizing execution of the copy request when the copy request is in a Recovery Point Objective alerted state with an oldest time-to-Recovery-Point-Objective-violation value, wherein the first rule has a higher priority than the second rule, and wherein a third rule of the plurality of rules includes prioritizing execution of the copy request based upon an oldest request generation time when both the copy request and another copy request match one of the first and second rule, wherein the second rule has a higher priority than the third rule.

* * * * *